United States Patent
Alapuranen

(10) Patent No.: US 7,620,076 B2
(45) Date of Patent: Nov. 17, 2009

(54) SYSTEM AND METHOD FOR VARIABLY INSERTING TRAINING SYMBOLS INTO TRANSMISSIONS BY ESTIMATING THE CHANNEL COHERENCE TIME IN A WIRELESS COMMUNICATION NETWORK

(75) Inventor: Pertti O. Alapuranen, Deltona, FL (US)

(73) Assignee: MeshNetworks, Inc., Maitland, FL (US)

( * ) Notice: Subject to any disclaimer, the term of this patent is extended or adjusted under 35 U.S.C. 154(b) by 666 days.

(21) Appl. No.: 11/209,980

(22) Filed: Aug. 23, 2005

(65) Prior Publication Data
US 2007/0064785 A1 Mar. 22, 2007

(51) Int. Cl.
*H04B 17/00* (2006.01)
*H04J 3/12* (2006.01)
(52) U.S. Cl. ............... 370/523; 375/224; 375/259
(58) Field of Classification Search ......... 370/523; 375/135, 138, 146, 224–227, 259, 295
See application file for complete search history.

(56) References Cited

U.S. PATENT DOCUMENTS

| | | | |
|---|---|---|---|
| 6,314,147 B1* | 11/2001 | Liang et al. | 375/346 |
| 6,504,868 B1 | 1/2003 | Koizumi | |
| 6,724,815 B1 | 4/2004 | Jepsen et al. | |
| 6,807,165 B2 | 10/2004 | Belcea | |
| 6,873,839 B2 | 3/2005 | Stanforth | |
| 6,931,030 B1 | 8/2005 | Dogan | |
| 7,180,916 B2* | 2/2007 | Chou et al. | 370/523 |
| 7,233,773 B2* | 6/2007 | Hansen et al. | 455/69 |
| 2002/0058502 A1 | 5/2002 | Stanforth | |
| 2002/0181390 A1* | 12/2002 | Mody et al. | 370/208 |
| 2003/0058975 A1 | 3/2003 | Baas et al. | |
| 2005/0180315 A1 | 8/2005 | Chitrapu et al. | |
| 2005/0213676 A1* | 9/2005 | Stopler | 375/260 |
| 2006/0039498 A1* | 2/2006 | de Figueiredo et al. | 375/297 |
| 2007/0140374 A1* | 6/2007 | Raleigh et al. | 375/267 |

FOREIGN PATENT DOCUMENTS

| | | |
|---|---|---|
| DE | 112006002207 T5 | 6/2008 |
| WO | 2007024356 A2 | 3/2007 |

OTHER PUBLICATIONS

PCT International Preliminary Report Application No. PCT/US2006/027151 Dated Mar. 26, 2009—8 pages.
PCT International Search Report and Written Opinion Application No. PCT/US2006/027151 Dated Mar. 11, 2008—8 pages.

* cited by examiner

*Primary Examiner*—William Trost, IV
*Assistant Examiner*—Roberta A Shand
(74) *Attorney, Agent, or Firm*—Randi L. Karpinia; Joseph J. Buczynski

(57) ABSTRACT

A system and method for controlling the quantity of training symbols in a transmission sequence sent by a terminal (102, 106, 107) in a wireless network (100). The transmission sequence include training symbols and data symbols. The system and method determine the number of data symbol errors which are close to training symbols in the transmission sequence, determine the number of symbol data errors which are far from training symbols in the transmission sequence, and adjust the quantity of training symbols in the transmission sequence based on a result of a comparison of the ratio of the number of data symbol errors which are close to training symbols to the number of data symbol errors which are far from training symbols.

20 Claims, 3 Drawing Sheets

SYSTEM AND METHOD FOR VARIABLY INSERTING TRAINING SYMBOLS INTO TRANSMISSIONS BY ESTIMATING THE CHANNEL COHERENCE TIME IN A WIRELESS COMMUNICATION NETWORK

FIELD OF THE INVENTION

The present invention relates to a system and method for variably inserting training symbols into transmissions occurring in a wireless communication network, in particular, a wireless ad-hoc peer-to-peer communication network, by estimating the channel coherence time in the network. More particularly, the present invention relates to a system and method for determining the amount of training symbols to transmit into a transmission in a wireless communication network based on factors such as error rate and mobility.

BACKGROUND

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", filed on Jun. 29, 2001, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", and in U.S. Pat. No. 6,873,839 entitled "Prioritized-Routing for an Ad-Hoc, Peer-to-Peer, Mobile Radio Access System", the entire content of each being incorporated herein by reference.

As can be appreciated by one skilled in the art, channels being used by nodes during transmission can change from time to time. Channel coherence time ($T_c$), in this regard, is a measure of how long a channel being used by a particular node remains unchanged. $T_c$ depends on both the carrier frequency and vehicle speed. In particular, $T_c=1/B_d$, where $B_d$ is Doppler spread. Doppler spread, in this regard, depends on the carrier frequency, vehicle speed, and the radio channel. Moreover, channel coherence time can be defined as the time difference at which the magnitude or envelope correlation coefficient between two signals at the same frequency falls below 0.5.

The channel coherence time is important in throughput optimization as systems can be designed to be mobile or stationary. Stationary systems, in this regard, do not have to transmit information for use in channel equalization as often as do highly mobile systems. For example, systems complaint with the IEEE Standard 802.11a (e.g., version IEEE Std. 802.11a-1999 (R2003)) and systems operating in accordance with variations of this standard, transmit training symbols at the start of a transmission and, after that, insert only pilots for each data symbol. This approach is spectrally efficient but limits mobility of the transmitting devices. On the other hand, if training symbols are transmitted more often, then the total throughput is lower than necessary when the transmitting devices are stationary.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
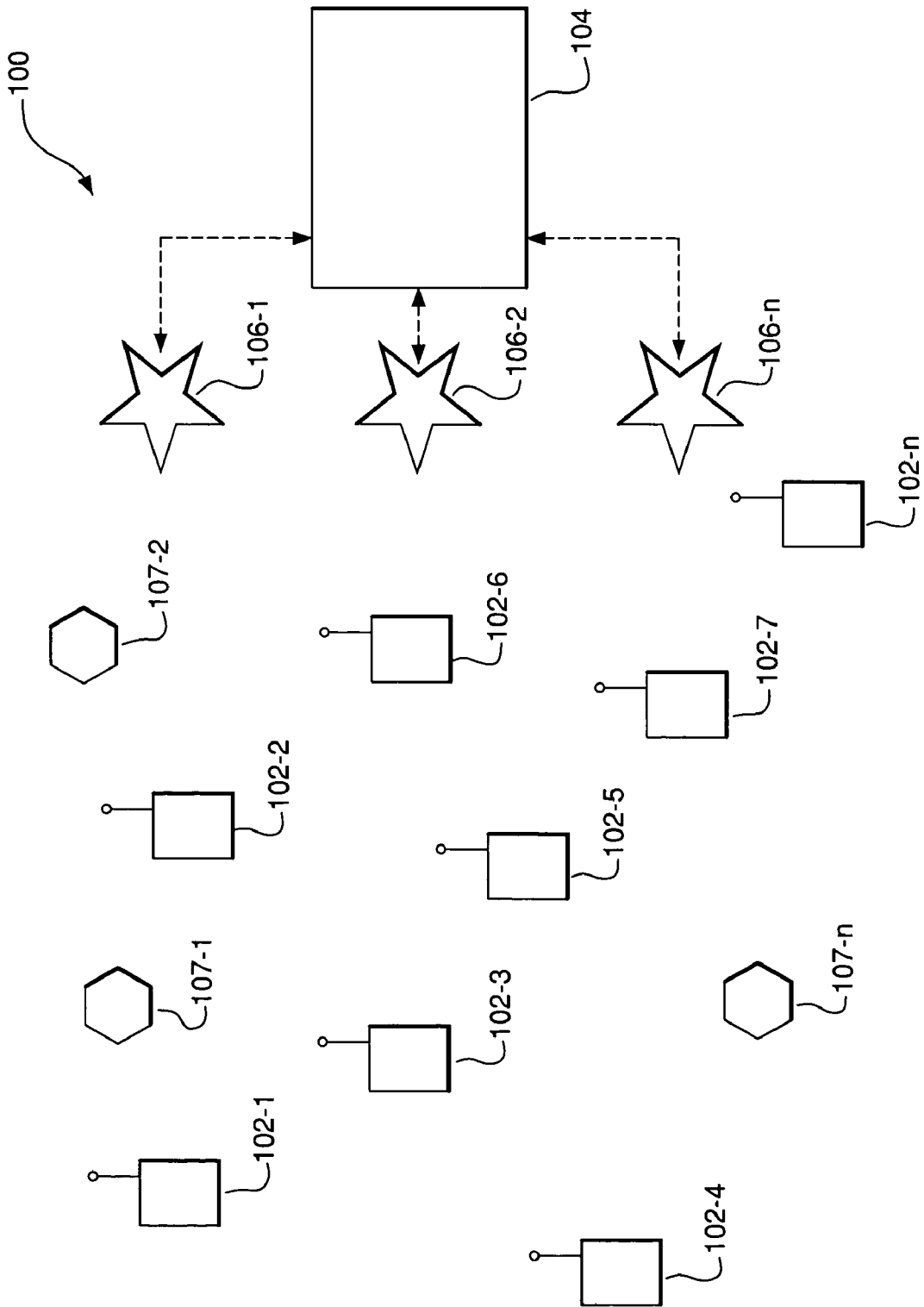
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for variably inserting training symbols into transmissions occurring in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for variably inserting training symbols into transmissions occurring in a wireless communication network as described herein. The non-processor circuits may include, but are not limited to, a radio receiver, a radio transmitter, signal drivers, clock circuits, power source circuits, and user input devices. As such, these functions may be interpreted as steps of a method to perform operations for variably inserting training symbols into transmissions occurring in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for controlling the quantity of training symbols in a transmission sequence sent by a terminal in a wireless network, wherein the transmission sequence comprises training symbols and data symbols. The system and method perform the operations of determining the number of data symbol errors which are within a first distance (e.g., close) from training symbols in the transmission sequence; determining the number of symbol data errors which are at a second distance (e.g., far) from training symbols in the transmission sequence, the second distance being greater than the first distance; and adjusting the quantity of training symbols in the transmission sequence based on a result of a comparison of the ratio of the number of data symbol errors which are at the first distance from training symbols to the number of data symbol errors which are at the second distance from training symbols.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", "terminals" or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 6,807,165, 7,072,650 and 6,873,839, referenced above.

Figure 2:
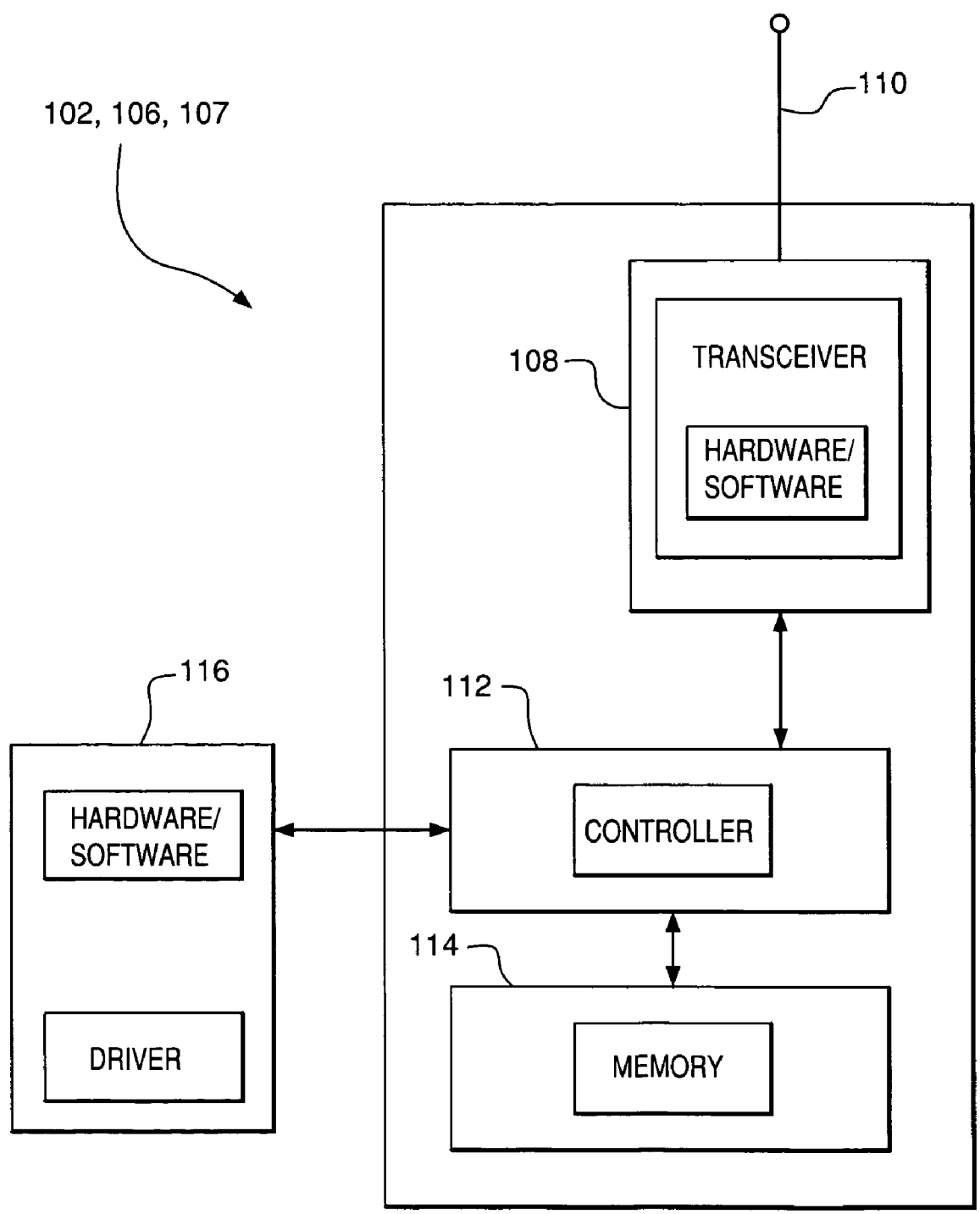
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As discussed briefly above, the channels being used by a node during transmission can change from time to time. In particular, for example, channel coherence time can be approximately 1.59 milliseconds (ms) for a node traveling at or about 120 km/h and transmitting at or about a frequency of 2400 megahertz (MHz), whereas channel coherence time can be approximately 765 microseconds (μs) for a node traveling at or about 120 kilometers/hour (km/h) and transmitting at or about a frequency of 5000 MHz. Moreover, channel coherence time is about 30 ms for a node moving at or about 3 km/h, which is a typical pedestrian mobility rate. It is preferable, in this regard, that the amount of training information be optimized depending on the degree of mobility of the terminal, and that the amount of training information in a transmission packet be controlled to optimize bandwidth.

Figure 3:
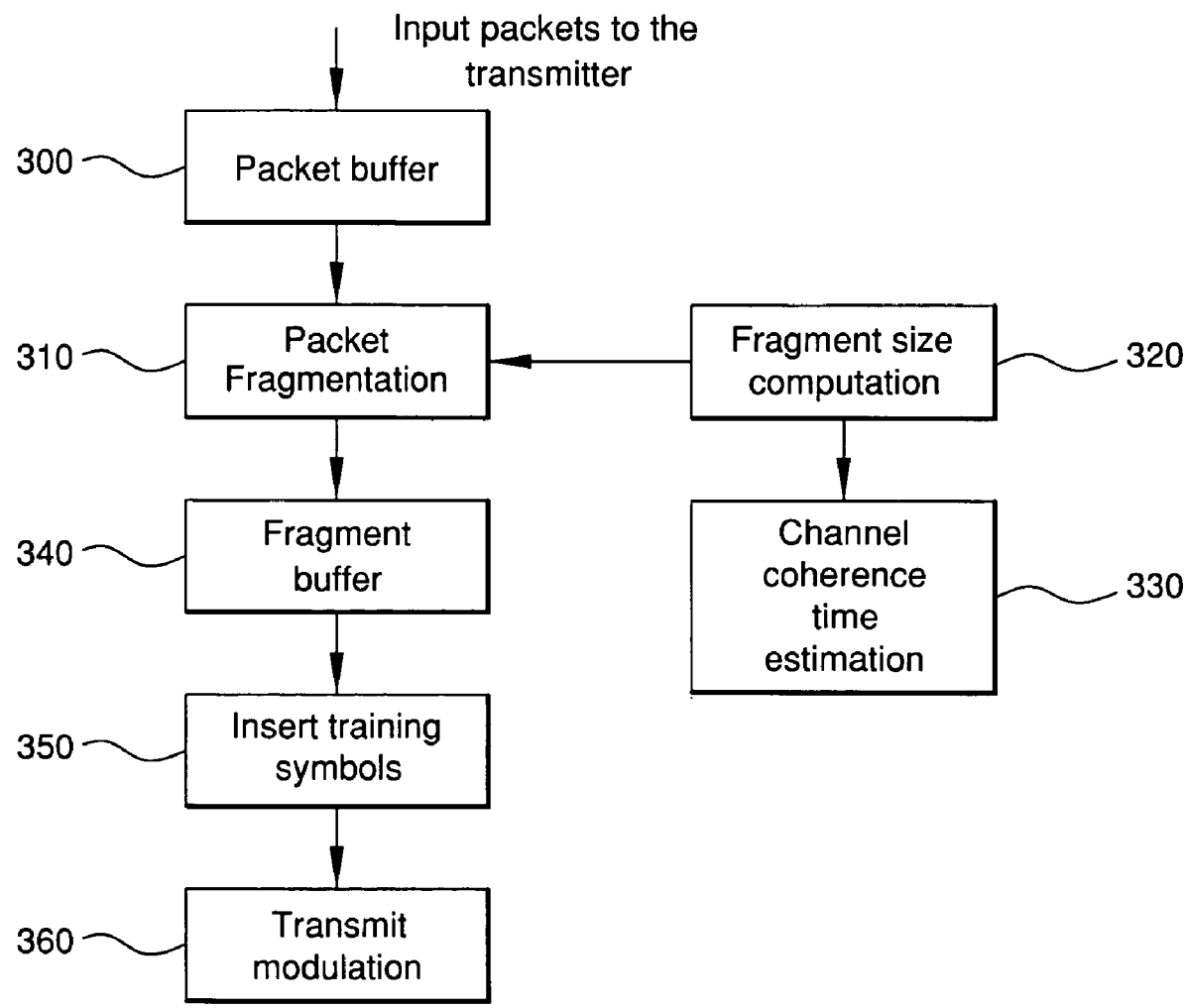
FIG. 3 is a flow chart showing an example of operations performed by a node in the network shown in FIG. 1 upon reception of input packets.

Determining when the reception of erroneous data symbols is due to mobility of a terminal is important to be able to properly mitigate the problem. A preferred method to do this is to split large transmission packets into segments, wherein each segment consists of tens or hundreds of symbols. As illustrated in FIG. 3, for example, when input packets arrive at a transmitter in step 300, packets can be fragmented in step 310 to short fragments of symbols using the length in time information from fragment size computation in step 320, that determines the maximum fragment size based on channel coherence time estimation in step 330. Then, following a fragment buffering in step 340, the transmitter inserts training symbols between fragments in step 350 and performs the rest of the transmit modulation in step 360.

The number of data symbol errors (or bit errors) is preferably computed relative to each segment. In particular, the quantity of data symbol errors close to training symbols ("close errors") can be compared to the quantity of data symbol errors far from training symbols ("far errors"). These quantities can be compared and if the ratio of "far errors" to "close errors" is greater than a threshold ratio, then a decision can be made to add more training symbols to the transmit sequence. In particular, for example, the statistical computation over N frames, where N can be any reasonable value (such as 10, example) may show that bits decoded from a symbol next to the training symbols show much lower error than bits computed from the last symbol before the next training symbol or the end of the frame if there is no next training symbol.

In Orthogonal Frequency Division Multiplexing (OFDM) modulation, for example, training symbols are transmitted first, followed by a sequence of data symbols. If, in this regard, the symbol error rate (or bit error rate) of current data symbols in a packet is compared to the symbol error rate of prior data symbols in the same packet, and the comparison is done before the packet ends or before a next training, and there is a difference that is larger than some threshold, then additional training symbols can be added between the current and last data symbols in a transmission packet. Alternatively, or in addition, the packet size can be adaptively shortened until the threshold for the difference is not exceeded.

The symbol error rate (or bit error rate) measurement can be filtered in order to obtain more reliable information. Moreover, a terminal (e.g., any node 102, 106 or 107) utilizing this method can iteratively add additional training symbols to a transmission sequence based on the quantity of errors measured. Moreover, a node can employ a system that dynamically adds training symbols in high mobility contexts. Moreover, information pertaining to the number and location of the training symbols in a transmission sequence (such as, for example, the number of data symbols before a training symbol) can be added to the packet header.

It is suitable for an existing system, such as an 802.11a compliant system (e.g., version IEEE Std. 802.11a-1999 (R2003)), to employ the method described in the present application and to be backwards-compatible if information bits in the header are not used by devices that do not know their purpose. If a transmitter (e.g., transceiver 108 shown in FIG. 2) of a node starts communication, for example, the transmitter can send a packet that contains a bits set containing information about the mode (e.g., high or low mobility mode), and a compatible receiver (e.g., a transceiver 108 in another node) can read bits and interpret as information of capability for adding additional training symbols. Accordingly, all further communications between these nodes can use a more advanced high mobility mode if needed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for controlling the quantity of training symbols in a transmission sequence sent by a terminal in a wireless network, wherein the transmission sequence comprises training symbols and data symbols, the method comprising:
   determining the number of data symbol errors which are at a first distance from training symbols in the transmission sequence;
   determining the number of data symbol errors which are at a second distance from training symbols in the transmission sequence, the second distance being greater than the first distance; and
   adjusting the quantity of training symbols in the transmission sequence based on a result of a comparison of the ratio of the number of data symbol errors which are at the first distance from the training symbols to the number of data symbol errors which are at the second distance from the training symbols.

2. The method of claim 1, wherein the quantity of training symbols in the transmission sequence is increased when the ratio is greater than a threshold ratio.

3. The method of claim 1, wherein the wireless network includes a wireless ad-hoc multi-hopping communication network in which the terminal operates.

4. The method of claim 1, wherein the terminal is an 802.11a compliant system.

5. The method of claim 1, wherein the method is performed by the terminal with every transmission by the terminal.

6. The method of claim 1, wherein the method farther comprises filtering the results of both determining steps.

7. The method of claim 1, wherein the method farther comprises including information pertaining to the mode, number, or location of training symbols in the transmission sequence in a header region of the transmission sequence.

8. The method of claim 7, wherein the method farther comprising receiving the transmission sequence at another terminal in the network, and adjusting the number of training symbols in the transmission sequence by the another terminal, based on the information contained within the header region of the received transmission sequence.

9. The method of claim 8, wherein the method further comprises sending a feedback communication from the another terminal to the terminal, following reception by the another terminal of the transmission sequence, wherein the feedback communication includes information pertaining to the number of training symbols that were added by the another terminal to the transmission sequence.

10. The method of claim 9, wherein the method further comprises adjusting the number of training symbols added to subsequent transmission sequence by the terminal, based on the feedback communication.

11. A system for controlling the quantity of training symbols in a transmission sequence sent by a terminal in a wireless network, wherein the transmission sequence comprises training symbols and data symbols, the system comprising:
   a controller disposed at the terminal, and operating to determine the number of data symbol errors which are at a first distance from training symbols in the transmission sequence, and to determine the number of data symbol errors which are at a second distance, greater than the first distance, from training symbols in the transmission sequence; and the controller further operating to adjust the quantity of training symbols in the transmission sequence based on a result of a comparison of the ratio of the number of data symbol errors which are at the first distance from the training symbols to the number of data symbol errors which are at the second distance from the training symbols.

12. The system of claim 11, wherein the controller operates to increase the quantity of training symbols in the transmission sequence when the ratio is greater than a threshold ratio.

13. The system of claim 11, wherein the wireless network includes a wireless ad-hoc multi-hopping communication network in which the terminal operates.

14. The system of claim 11, wherein the terminal is an 802.11a compliant system.

15. The system of claim 11, wherein the system further operates to determine the number of data symbol errors and to adjust the quantity of training symbols in the transmission sequence with every transmission by the terminal.

16. The system of claim 11, wherein the system further operates to filter the results of both determining steps.

17. The system of claim 11, wherein the system further operates to include information pertaining to the mode, number, or location of training symbols in the transmission sequence in a header region of the transmission sequence.

18. The system of claim 17, wherein the system further operates to receive the transmission sequence at another terminal in the network, and adjust the number of training symbols in the transmission sequence by the another terminal, based on the information contained within the header region of the received transmission sequence.

19. The system of claim 18, wherein the system further operates to send a feedback communication from the another terminal to the terminal, following reception by the another terminal of the transmission sequence, wherein the feedback communication includes information pertaining to the number of training symbols that were added by the another terminal to the transmission sequence.

20. The system of claim 19, wherein the system further operates to adjust the number of training symbols added to subsequent transmission sequence by the terminal, based on the feedback communication.

* * * * *

UNITED STATES PATENT AND TRADEMARK OFFICE
CERTIFICATE OF CORRECTION

| | | |
|---|---|---|
| PATENT NO. | : 7,620,076 B2 | Page 1 of 1 |
| APPLICATION NO. | : 11/209980 | |
| DATED | : November 17, 2009 | |
| INVENTOR(S) | : Alapuranen | |

It is certified that error appears in the above-identified patent and that said Letters Patent is hereby corrected as shown below:

IN THE CLAIMS

In Column 6, Line 36, in Claim 6, delete "farther" and insert -- further --, therefor.

In Column 6, Line 38, in Claim 7, delete "farther" and insert -- further --, therefor.

In Column 6, Line 43, in Claim 8, delete "farther" and insert -- further --, therefor.

Signed and Sealed this
Twentieth Day of September, 2011

David J. Kappos
*Director of the United States Patent and Trademark Office*